(12) United States Patent
Irvine et al.

(10) Patent No.: US 7,504,172 B2
(45) Date of Patent: Mar. 17, 2009

(54) PEROVSKITE-BASED FUEL CELL ELECTRODE AND MEMBRANE

(75) Inventors: John Thomas Sirr Irvine, Anstruther, Fife (GB); Shanwen Tao, St Andrews, Fife (GB)

(73) Assignee: The University Court of the University of St. Andrews (GB)

( * ) Notice: Subject to any disclaimer, the term of this patent is extended or adjusted under 35 U.S.C. 154(b) by 496 days.

(21) Appl. No.: 10/523,093

(22) PCT Filed: Jul. 31, 2003

(86) PCT No.: PCT/GB03/03344

§ 371 (c)(1),
(2), (4) Date: Feb. 1, 2005

(87) PCT Pub. No.: WO2004/013925

PCT Pub. Date: Feb. 12, 2004

(65) Prior Publication Data

US 2005/0266297 A1    Dec. 1, 2005

(30) Foreign Application Priority Data

Aug. 1, 2002    (GB) .................................. 0217794.7

(51) Int. Cl.
*H01M 8/12* (2006.01)
*H01M 8/10* (2006.01)

(52) U.S. Cl. ............................. 429/30; 429/32; 429/33

(58) Field of Classification Search ............. 429/12–46
See application file for complete search history.

(56) References Cited

U.S. PATENT DOCUMENTS 5,686,198 A    11/1997    Kuo et al. .................... 429/30

FOREIGN PATENT DOCUMENTS

| EP | 411547 A1 | * | 2/1991 |
| JP | 01200560 | | 8/1989 |
| JP | 02236959 | | 9/1990 |
| WO | WO 03/036746 A2 | * | 5/2003 |

OTHER PUBLICATIONS

Mikkelsen et al., Oxygen transport in La1-xSrxFe1-yMnyO-d perovskites, 2002, Elsevier Science B.V., Solid State Ionics 152-153, pp. 703-707.*

(Continued)

*Primary Examiner*—Dah-Wei D Yuan
*Assistant Examiner*—Maria J Laios
(74) *Attorney, Agent, or Firm*—Gifford, Krass, Sprinkle, Anderson & Citkowski, P.C.

(57) ABSTRACT

The present invention provides a material suitable for use in a solid oxide fuel cell, wherein the material is of an, optionally doped, double perovskite oxide material having the general formula (I): $(Ln_aX_b)_e(Z^1_cZ^2_d)_fO_g$ (I) wherein Ln is selected from Y, La and a Lanthanide series element, or a combination of these and X also represents an element occupying the A site of a perovskite oxide and is selected from Sr, Ca and Ba, and $Z^1$ and $Z^2$ represent different elements occupying the B site of a perovskite oxide and are selected from Cr, Mn, Mg and Fe, and wherein a has a value from 0 to 1, preferably 0.7 to 1.0, b has a value of from 1 to 0, preferably 0.3 to 0, and each of c and d has a value of from 0.25 to 0.75, provided that a+b has a value of 1, and c+d, has a value of 1, and wherein e has a value of from 0.8 to 1, wherein f has a value of from 0.8 to 1, and g has a value of from 2.5 to 3.2. Also provided are SOFCs having an electrode or functional layer of a material or containing a material of the invention, as well as mixed ionic/electronic conducting membranes suitable for use in a syngas reactor or oxygen separator, comprising a layer of a double perovskite material of the invention, and a method of oxidising a fuel in an SOFC having an anode of a double perovskite material of the invention.

17 Claims, 5 Drawing Sheets

OTHER PUBLICATIONS

Mikkelsen et al. Oxygen transport in La1-xSrxFe1-yMnyO3-d perovskites; (2002); Solid State Ionics 152 153 pp. 703-707, available online Sep. 2002.*

Koc, Rasit and H.U. Anderson, Investigation of strontium-doped La(Cr,Mn)O3 for solid oxide fuel cells, Nov. 28, 1991, Journal of Materials Sience, 27 (1992). pp. 5837-5843.*

Palma, J. et al: "Perovskite-Type (LA, SR)(MN, CR) 03 Compounds for SOFC Cathodes" Proceedings of the International Symposium on Solid Oxide Fuel Cells, Athens, Jul. 2-5, 1991, Luxemburg, EEC, LU, vol. SYMP. 2, Jul. 2, 1991, pp. 537-544, XP000546146.

Rasit Koc et al.: "Structural, Sintering and Electrical Properties of the Perovskite-Type (LA, SR) (CR,MN)03" Extended Abstracts, Fall Meeting, Hollywood, Electrochemical Society, vol. 89/2 (1989), p. 799, XP000276907.

Mori Masashi et al: "Control of the Thermal Expansion of Strontium-doped Ianthanum chromite perovskites by b-site doping for high-temperature solid oxide fuel cell separators" J Am Ceram Soc;Journal of the American Ceramic Society, Apr. 2001, vol. 84, No. 4, Apr. 2001, pp. 781-786, XP002263206.

Vernoux Philippe et al: "Catalytic and Electrochemical Properties of Doped Lanthanum Chromites as New Anode Materials for Solid Oxide Fuel Cells" J Am Ceram Soc; Journal of the American Ceramic Society, Oct. 2001, vol. 84, No. 10, Oct. 2001, pp. 2289-2295, XP002263207.

Wang, Z.M. et al: "The effect of Average A-Site Cation Radius on TC in Perovskite Manganites" Journal of Magnetism and Magnetic Materials, Elsevier Science Publishers, AMsterdam, NL, vol. 234, No. 2, Sep. 2001, pp. 213-217, XP004300664.

* cited by examiner

PEROVSKITE-BASED FUEL CELL ELECTRODE AND MEMBRANE

FIELD OF THE INVENTION

The present invention relates to fuel cell electrodes, and more particularly to electrodes suitable for use in solid oxide fuel cells (SOFCs).

BACKGROUND OF THE INVENTION

There is a great need for and interest in more efficient means of converting chemical energy into electrical energy, which has created great interest in fuel cells. The practical commercial development of these has, though, been held back by numerous practical problems. The SOFC is a particularly attractive system, which can utilize hydrocarbon fuels such as methane with internal reforming of the fuel, and achieve relatively high efficiencies. Significant problems remain, though, in relation to inter alia the design of the anode used.

Many different materials have been tried in the search for improved anode performance, including materials such as Ni/YSZ (YSZ=$Y_2O_3/ZrO_2$) which has relatively good performance but suffers from the substantial disadvantage of relatively short working life due to the formation of carbon deposits when using hydrocarbon fuels, susceptibility to poisoning with sulphur which is frequently encountered in hydrocarbon fuels and an intolerance to repeated reduction/oxidation cycling, as was encountered in small systems such as CHP units or APUs for automotive applications. It has also been proposed to use $LaCrO_3$ (P. Vernoux et al J. Electrochem. Soc. 145 3487-3492 (1998)), and more recently it has been proposed to utilize $LaCrO_3$ which has been doped with various elements in order to improve its performance (J. Liu et al Electrochemical and Solid-State Letters 5 A122-A125 (2002)). Nevertheless even such doped $LaCrO_3$ has relatively limited electrochemical performance and effective working life.

It is an object of the present invention to avoid or minimize one or more of the above mentioned disadvantages.

It has now, by consideration of a novel approach, been found that by using a double perovskite material based on $LaCrO_3$ instead of a doped $LaCrO_3$, it is possible to achieve electrical and catalytic properties comparable with prior art anode materials such as Ni based anodes (that is with overpotential losses which can be less than 100 mV at current densities of 400 $mAcm^{-2}$) without the need for using metallic current conducting components, normally nickel and without significant carbon formation and deposition when using hydrocarbon fuels. Unlike previously tried doped $LaCrO_3$ in which a small number of the La and/or Cr atoms in $LaCrO_3$, typically 5 to 10%, or at most 20%, are replaced by different atoms, resulting in a doped form of a "single" perovskite, in a double perovskite material the B sites of the perovskite crystal lattice structure, normally occupied substantially wholly by Cr, are occupied by similar amounts of two different elements. It should be emphasised that the term double perovskite is used here to emphasise double occupation B-site, and not necessarily to imply any structural order that manifests itself as two different structural B-sites existing in the lattice.

SUMMARY OF THE INVENTION

Thus in one aspect the present invention provides a novel material suitable for use in a solid oxide fuel cell, especially in an anode thereof, wherein the material is of an, optionally doped, double perovskite oxide material having the general formula I:

$$(Ln_a X_b)_e (Z^1_c Z^2_d)_f O_g \quad\quad (I)$$

wherein Ln is selected from Y, La and a Lanthanide series element, or a combination of these and X also represents an element occupying the A site of a perovskite oxide and is selected from Sr, Ca and Ba, and $Z^1$ and $Z^2$ represent different elements occupying the B site of a perovskite oxide and are selected from Cr, Mn, Mg and Fe, and wherein a has a value from 0 to 1, preferably, 0.7 to 1.0, b has a value of from 1 to 0, preferably 0.3 to 0, and each of c and d has a value of from 0.25 to 0.75, provided that a+b has a value of 1, and c+d, has a value of 1, and wherein e has a value of from 0.8 to 1, wherein f has a value of from 0.8 to 1, and g has a value of from 2.5 to 3.2.

Thus it will be appreciated that although the $Z^1$ and $Z^2$, elements are preferably present in substantially equivalent amounts, they can nevertheless depart to some extent from exactly equivalent amounts. Also it is possible for the A site in the perovskite material (occupied by Ln and X), and/or the B site in the perovskite material (occupied by $Z^1$ and $Z^2$), to be somewhat depleted (e<1 and f<1) without disrupting the crystal structure thereof and significantly degrading the properties of the anode. Similarly, although g normally has a value of 3, some crystal defects in relation to the O sites are also acceptable. More particularly some O site deficiency (g<3) is acceptable and indeed may be useful in that it allows for O atom mobility between different O sites within the crystal lattice of the material. A limited degree of excess O atoms (g>3) is also acceptable in at least some circumstances.

The novel double perovskite materials provided by the present invention can be used in the production of anodes for use in SOFCs and which have significantly improved electrochemical performance, electrical and catalytic properties when compared with anodes of previously known materials, when used with methane fuel, whilst avoiding the particular problems and disadvantages of previously proposed electrodes such as Ni—YSZ. More particularly it has been found that they are chemically redox stable, which may significantly decrease the volume instability during redox cycling that causes degradation.

Whilst the novel materials of the present invention are particularly valuable for use as anodes in SOFCs, they also have other applications in SOFCs including as one or more of: anode functional layer, cathode functional layer, cathode, and interconnector.

As used herein "functional layer" indicates a thin electroactive layer provided between the electrode current collector (anode or cathode) and the electrolyte; or possibly between the anode or cathode current collector and another functional layer, for the purposes of protecting the electrode itself from degradation (typically due to interfacial reaction), and/or enhancing catalytic activity and/or enhancing the performance characteristics (e.g. reducing polarisation resistance). Typically such a functional layer could have a thickness of from 1 to 50 µm, preferably 20 to 30 µm. The functional layer may moreover be substantially solid or have more or less greater porosity, for example, up to 70% porosity, preferably from 30 to 60% porosity, conveniently from 40 to 50% porosity.

The term interconnector indicates a component used for connecting together the electrodes of neighbouring cells in an assembly of a plurality of cells connected together in series. In this case the materials are preferably made with high density (i.e. low porosity, preferably not more than 1% porosity, advantageously zero continuous porosity) in order to make them substantially gas-impermeable.

As indicated above, materials of the present invention can, surprisingly, be used as both anodes and cathodes. This makes it possible to produce a cell with the same anode and cathode electrodes whereby it is possible to operate the cell using either electrode as cathode and anode, and even to reverse operation of the cell when required, for example, in a reversible fuel cell application (in which energy can be stored temporarily by applying a voltage to the electrodes), by changing the cell connections so that the anode becomes the cathode and vice versa.

Preferably $Z^1$ and $Z^2$ represent Cr and Mn, respectively.

Advantageously X represents Sr.

Although it is a particular feature of the novel materials provided by the present invention, that they have a distinctly different nature and composition from the previously known doped single perovskite materials, the double perovskite materials used in accordance with the present invention may nevertheless also be doped to some extent i.e. any one or more of the A and B sites which would otherwise be occupied by Ln, X, $Z^1$ and $Z^2$, may be replaced to a limited degree by one or more suitable dopant elements in order to improve still further electrical and/or catalytic properties.

Suitable dopants at the B sites i.e. replacing either or both of some $Z^1$ and some $Z^2$ sites, for improving electrical conductivity include V, Fe, Cu, Co, Ti, Nb, Mo, Ru and Ni, whilst suitable dopants for improving catalytic activity include Pd, Ce, Ni, Ru and Mg. In general the dopant should not occupy more than 20% of the B sites of the double perovskite oxide. Where there is used a dopant, this is preferably present at a level of not more than 20%, preferably from 5 to 20%.

The novel materials of the present invention may be used with various different electrolytes. In particular they have been found to be compatible and suitable for use with yttria stabilised zirconia (YSZ) electrolyte which exhibits good thermal and chemical stability. As used herein the expression "double perovskite" indicates a material in which the B sites in the crystal lattice structure of said material are populated by comparable substantial amounts of two different elements, with not less than 25%, preferably not less than 30% of the B sites populated by said two different elements. Thus, although the invention encompasses materials in which one of the elements can occupy as many as 75% of the B sites, and the other as few as 25%, substantial amounts of each one (at least 25%, preferably at least 30%) are present, and the relative amounts (3:1 or less) are comparable—unlike in a doped material in which the elements are in a relative ratio of at least 4:1 and often 10:1 or more.

It should also be noted that the B sites could also be occupied by a third element (Z3) present in an amount of at least 30%, which is comparable to that of the first two elements. Whilst such a material could be described as a triple perovskite, it should be understood to be also encompassed within the "double perovskites" of the present invention. Again the term "triple" reflects composition at the B-site rather than a specific type of structural ordering.

Preferred materials provided by the present invention are those in which in general formula I, each of c and d has a value of at least 0.4. Desirably, in general formula I, a has a value of from 0.7 to 0.9, most preferably from 0.72 to 0.85.

Particularly preferred $Z^1$ and $Z^2$ species are Cr and Mn, whilst a particularly preferred X species is Sr.

The novel materials of the present invention may be prepared by any suitable method known in the art. In general two or more compounds consisting essentially of the required metallic elements in suitable proportions, in the form of suitable oxides or salts with nitric acids, are brought together into intimate admixture with heat treatment. One convenient method comprises a solid state reaction in which dry oxides and/or carbonates (or other salts such as acetates, oxalates etc) of the metal elements are mixed together and fired at a high temperature, typically of the order of 1000 to 1400° C. Another convenient method comprises combustion synthesis in which a solution of salts such as nitrates of the required metal elements in suitable proportions, in aqueous ethylene glycol, from which solution water is progressively removed to yield a gel which can be burnt to provide a char. Firing of the char at high temperature, typically above 1100° C., then yields the double-perovskite form of the material.

In order to make the material suitable for use as a fuel cell electrode, it is necessary for it to be in a relatively porous form which presents a relatively large surface area for chemical interactions to take place at. Preferably the electrode should have a porosity value of at least 20%, preferably from 30 to 60% advantageously from 40 to 50%, typically around 50%. In general suitably porous forms of the novel double perovskite material may be obtained by the addition of pore-forming agents (PFAs). The PFAs could be one or more of carbon and organic materials, such as PVB (polyvinyl butyral), PEG (polyethylene glycol), terpineol, ethyl cellulose etc.

The novel materials of the present invention may be used in various forms and configurations of SOFCs. Thus they may be used as anode and/or cathode, and/or functional layer, in planar or tubular SOFC or SOFC rolls.

The novel materials of the invention are substantially compatible with various electrolytes used in SOFCs, including in particular doped ceria and especially perovskites such as Sr- and Mg-doped $LaGaO_3$ etc, as well as undoped ceria.

In another aspect the present invention provides a SOFC having an electrode or functional layer of a novel material according to the present invention.

In a preferred aspect the present invention provides a SOFC having an anode of a novel material according to the present invention.

SOFCs using or containing an anode of the present invention may be used to oxidise any fuel appropriate for fuel cell use either directly or after at least partial reformation. Such fuels include hydrogen; hydrogen; a hydrocarbon fuel compound such as methane, ethane, propane, or butane; a hydrocarbon based fuel compound such as methanol or ethanol; and a non-hydrocarbon hydride fuel compound such as ammonia, hydrogen sulphide; as well as mixtures of such compounds such as LPG, gasoline, diesel, biogas, biofuel, kerosene, or JP8.

Thus in another aspect the present invention provides a method of oxidising a fuel in an SOFC, comprising the steps of:

a) providing an SOFC having an anode of the novel material of the present invention; and b) applying a voltage to said SOFC so as to oxidize said fuel.

It is also possible in at least some cases to use the new double perovskite materials provided by the present invention, in fuel cell cathodes, and accordingly the present invention also extends to a fuel cell cathode comprising a substantially porous body of a double perovskite according to the present invention. This provides the opportunity to use the same material as both cathode and anode in a SOFC with clear advantages with regard to compatibility issues.

In another aspect the invention provides a novel material suitable for use in an anode in a solid oxide fuel cell, wherein the material is of an, optionally doped, double perovskite oxide material having the general formula I:

$$(Ln_aX_b)_e(Z^1_cZ^2_d)O_3 \quad (I)$$

wherein Ln is selected from Y, La and a Lanthanide series element, or a combination of these and X represents an optional second element occupying the A site of a perovskite oxide and is selected from Sr, Ca and Ba, and $Z^1$ and $Z^2$ represent different elements occupying the B site of a perovskite oxide and are selected from Cr, Mn and Fe, and wherein a has a value from 0.7 to 1.0, b has a value of from 0.3 to 0, and each of c and d has a value of from 0.25 to 0.75, provided that a+b has a value of 1, and c+d, has a value of not less than 0.8, and wherein e has a value of from 0.8 to 1.

The novel double perovskite materials of the present invention may also be used in mixed-conducting ceramic membranes as a syngas reactor membrane or as a protective layer on the natural gas side of a syngas reactor membrane layer of another material (which typically comprises a dense layer of lanthanum strontium-iron-cobalt oxide) or a related composition. Such ceramic membranes are useful for partial oxidation of natural gas into synthesis gas, often referred to as syngas. Syngas can be used to make liquid diesel and other transportation fuels, as well as chemicals for the petrochemical, rubber, plastics, and fertilizer industries. Hydrogen can also be separated from the gas and used as an energy source or by a refinery to produce cleaner, higher-performance gasoline. The unique approach of the MIEC (mixed ionic/electronic conducting) membrane technology allows the integration of oxygen separation, steam- and $CO_2$-reforming, and partial oxidation of methane into a single process. By eliminating the need for a separate oxygen-production plant, the technology substantially reduces the energy and capital cost associated with conventional syngas production. The MIEC membrane technology can also help to reduce $NO_x$ emissions by using nitrogen oxides as an oxygen source. In addition, the energy contained in the oxygen-depleted air stream can be recovered through the generation of power and steam.

Thus in a further aspect the present invention provides a mixed ionic/electronic conducting membrane comprising a layer of a novel double perovskite material according to the present invention. Typically said layer comprises a protective layer on at least one side of a mixed ionic/electronic conducting ceramic membrane, and especially one suitable for use in a syngas reactor. Such a protective layer would generally have a thickness of from 1 to 200 µm, preferably from 20 to 70 µm. Where the membrane consists essentially of a novel double perovskite material according to the present invention, the membrane would generally have a thickness of from 10 to 500 µm, preferably from 20 to 100 µm. Such mixed ionic/electronic conducting membranes are also suitable for use in separating oxygen from air for various purposes, e.g. for the production of (substantially pure) oxygen gas, or for use directly in reactions with other materials (e.g. with methane in syngas production). It will be appreciated that in such membrane applications, the perovskite material should be made with high density (i.e. low porosity, preferably not more than 1% porosity, advantageously zero continuous porosity) in order to make them substantially gas-impermeable. Such membranes may be self supporting or supported on a porous metal or ceramic or metal/ceramic composite, support.

BRIEF DESCRIPTION OF THE DRAWINGS

Further preferred features and advantages of the invention will appear from the following detailed examples given by way of illustration, and drawings in which.

DETAILED DESCRIPTION OF THE PREFERRED EMBODIMENTS

EXAMPLE 1

Figure 1:
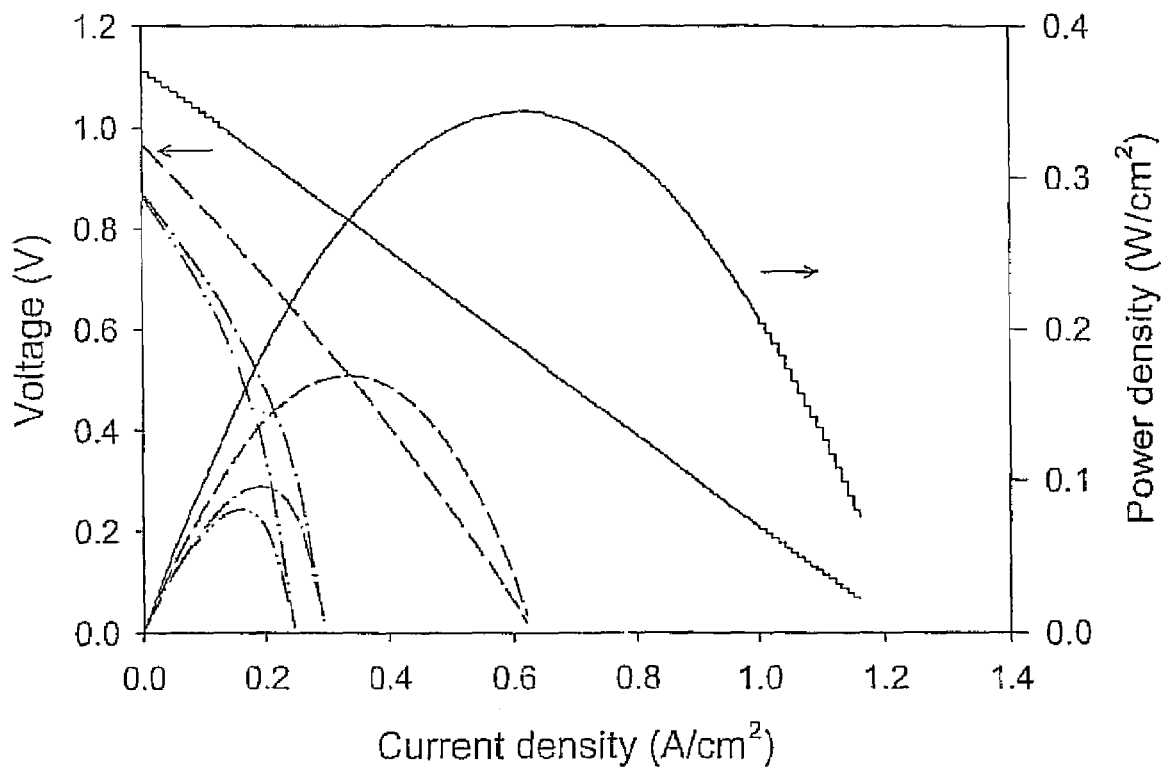
FIGS. 1, 3 and 4 are graphs showing measurement of various electrical properties obtained using anodes of the invention.

Preparation of Double Perovskite Material $La_2O_3$ (4.8873 g), $SrCO_3$ (1.4763 g), $Cr_2O_3$ (1.5199 g) and $MnO_2$ (1.7388 g) in powder form were mixed together in an agate mortar. The mixed powders were transferred into a zirconia container, with addition some acetone or ethanol and ball-milled for 15 minutes twice, and then left for 10 hours in a fume cupboard to evaporate the organic component.

The dried powders were then subjected to a series of high temperature firing and intermediate grinding cycles using a muffle furnace, as follows:
1. 12 hours at 1400° C.
2. 20 mins grinding
3. 12 hours at 1400° C.
4. repeat 2&3 once The above procedure yielded 9 g of a double perovskite in the form of a powder having the composition $La_{0.75}Sr_{0.25}Cr_{0.5}Mn_{0.5}O_3$ (LSCM). This phase exhibits a rhombohedral unit cell, a=5.4562(3) Å, α=60.440 (9)°.

EXAMPLE 2

Preparation of Double Perovskite Material $La_2O_3$ (4.8873 g), $SrCO_3$ (1.4763 g) and $MnCO_3$ (2.299 g) were dissolved in dilute nitric acid (40 mls 4 N) and heated to 80° C. with stirring until a solution is obtained. Then 8.0028 g $Cr(NO_3)_3.9H_2O$ was dissolved into the solution. 25 ml pure ethyl glycol was then added into the mixed nitrate solution and stirred at 80° C. for 2 hours. The obtained gel was transferred into a porcelain container and heated on a hot plate until firing into char. The char was further heated at 1100 to 1400° C. to obtain the perovskite oxide having the composition $La_{0.75}Sr_{0.25}Cr_{0.5}Mn_{0.5}O_3$.

EXAMPLE 3

Manufacture of Anode

The double perovskite material of Example 1 (0.45 g) was mixed with 0.05 g carbon (graphite) and 5 ml ethanol. The mixture was ground in an agate mortar or ball-milled for 30 minutes to form a slurry. The slurry was painted or screen-printed onto an 8 mol % $Y_2O_3$ stabilised zirconia (YSZ) 2 cm diameter disc with 2 mm thickness. The anode supported on the YSZ electrolyte was then fired from room temperature heating up at 5° C./min up to 1100° C., held at 1100° C. for 4 hours, and then cooled down to room temperature at 5° C./min. The thickness of the anode so obtained is about 30-100 μm with an area of 1 cm². A small amount of gold paste was partially coated onto the anode (ca. 50% coverage) and fired at 900° C. for 30 minutes using a 5° C./min heating up and cooling down rate in the range from 300° C. to 900° C., to ensure better electronic contact for testing purposes. Platinum paste (Engelhard Clal 6082) was painted onto the opposite side of the YSZ pellet and fired at 900° C. for 30 minutes with 5° C./min heating up and cooling down rates above 300° C. to provide a counter electrode (or cathode) and reference electrode, approximately 50 μm thick.

EXAMPLE 4

Use of Anode

The anode obtained in Example 3 was mounted in a solid oxide fuel cell configured in the form of a 0.2 mm thick layer of YSZ electrolyte. $La_{0.8}Sr_{0.2}MnO_3$ (LSM) was coated onto the other side of the YSZ sheet to provide a cathode. The slurry composition used in the production of the cathode was 0.45 g $La_{0.8}Sr_{0.2}MnO_3$, 0.05 g graphite and 5 ml ethanol. A thin layer platinum paste (see Example 3) was coated onto the LSM and fired at 900° C. for 30 minutes with 5° C./min heating up and cooling down rates above 300° C. to provide a cathode current collector.

FIG. 1 shows the performance of the cell using the double perovskite oxide $La_{0.75}Sr_{0.25}Cr_{0.5}Mn_{0.5}O_3$ anode of Example 3, when supplied with various different fuels: wet $H_2$, wet 5% $H_2$ or wet and pure $CH_4$, at 900° C. The cell had a 0.2 mm electrolyte, and data are shown for the following fuels, wet $H_2$; dash, wet 5% $H_2$; dash-dot, wet $CH_4$ and dash-dot-dot $CH_4$ at 1173K. While the open circuit voltages (OCVs) for wet 5% $H_2$ and wet $H_2$ were close to the value predicted by the Nerst equation, 0.95 and 1.09V at 900° C., the OCV for wet and unhumidified cylinder $CH_4$ was 0.87 and 086V respectively, which is slightly lower than that for wet 5% $H_2$. The maximum power densities were higher for wet $H_2$ than wet 5% $H_2$, with values of 0.34 W cm$^{-2}$ and 0.17 W cm$^{-2}$ respectively. The maximum power density for wet methane was about 0.1 W cm$^{-2}$ at 0.53V, which is slightly lower than that for wet 5% $H_2$.

EXAMPLE 5

Properties of Anode

Figure 2:
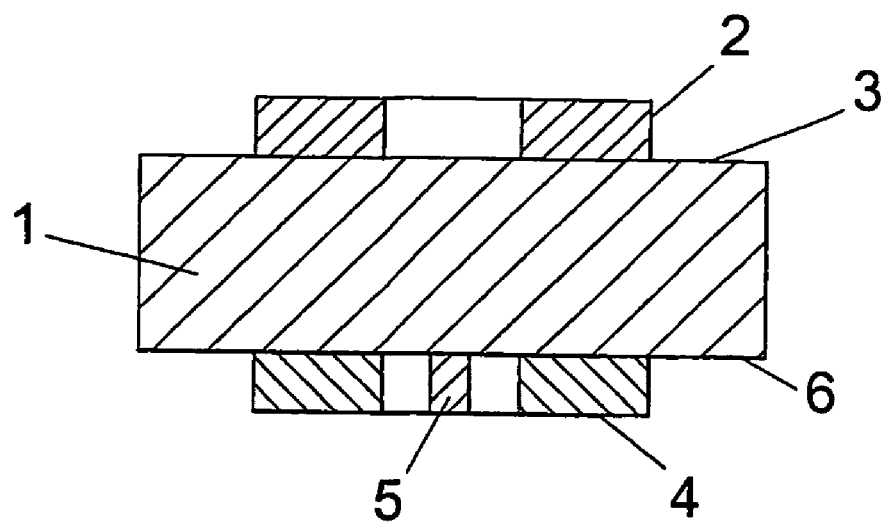
FIG. 2 is a schematic drawing of the principal parts of an electrochemical cell of the invention in sectional elevation.
Figure 2A:
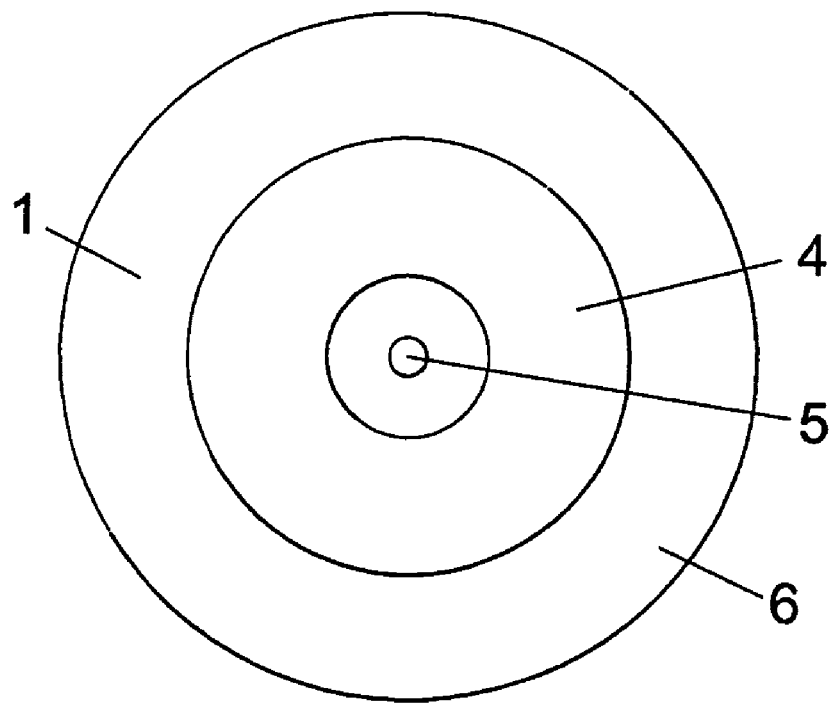
FIG. 2A is an underside plan view of the cell of FIG. 2.
Figure 3:
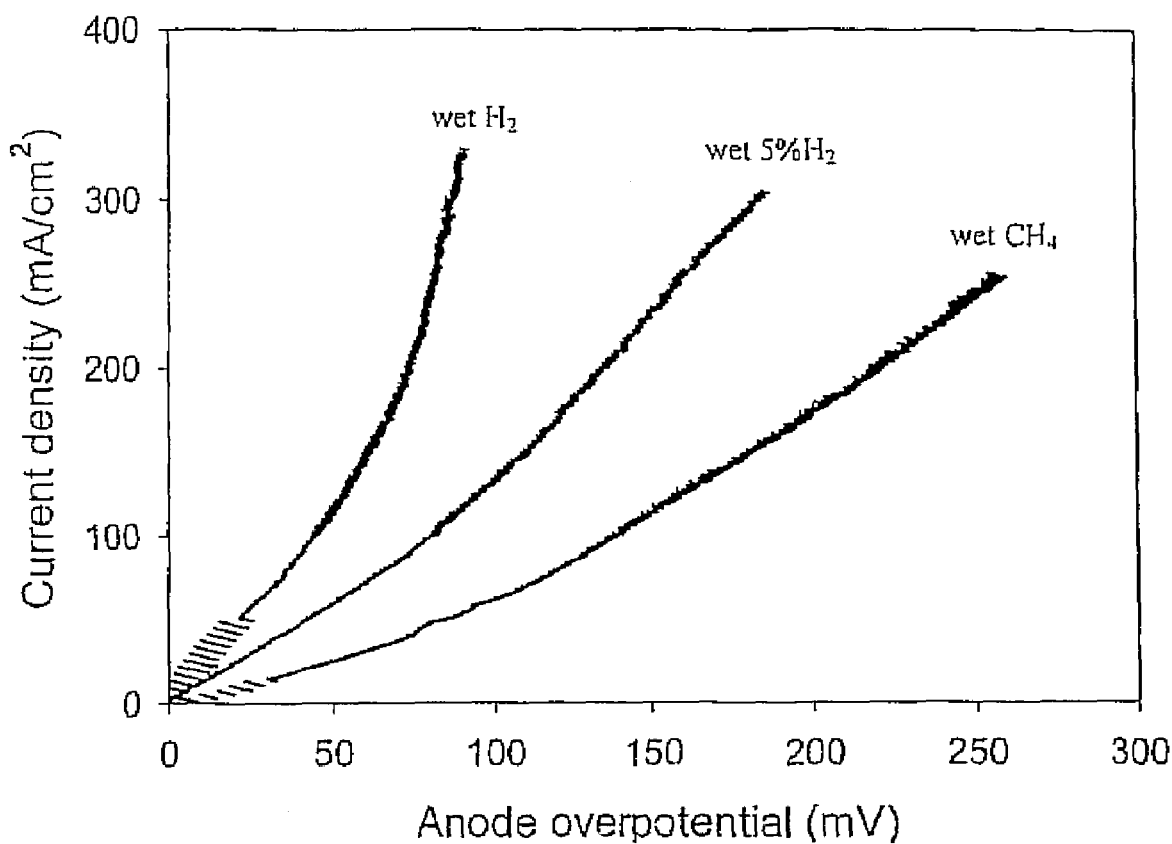

The properties of the anode of Example 3 were examined by means of a three-electrode configuration test cell illustrated schematically in FIGS. 2 and 2A, which show a disc shaped electrolyte 1 with an annular anode 2 on one face 3 and an annular cathode 4 and a central disc-form reference electrode 5 on the opposite face 6. The electrolyte was sintered 8 mol % $Y_2O_3$ stabilized $ZrO_2$ (YSZ) pellet with 2 mm thickness and 20 mm diameter. An anode with a thickness of about 50 μm was deposited onto the YSZ electrolyte using an ethanol-based slurry and firing typically at 1000 to 1300° C. Pt paste (as previously described) was painted onto the other side of YSZ as counter or cathode, and reference electrodes. The anode over-potential with wet $H_2$ is shown in FIG. 3. It was found that the anode resistance decreases under polarization which is closer to the real operation conditions than OCV. The polarization resistance is less than 0.3 Ω/cm² at a current density 300 mA/cm². With further optimization, this performance could readily be improved even more. FIG. 3 shows the potential and current change at 925° C. under operation using wet $CH_4$ as fuel at 0.4V bias using only $La_{0.75}Sr_{0.25}Cr_{0.5}Mn_{0.5}O_3$ as the anode. No significant performance degradation was observed during four hours operation although a trace amount of carbon was observed after the fuel cell performance in wet $CH_4$ and cooling down in the same atmosphere.

EXAMPLE 6

Preparation and use of Modified Anode

Figure 4:
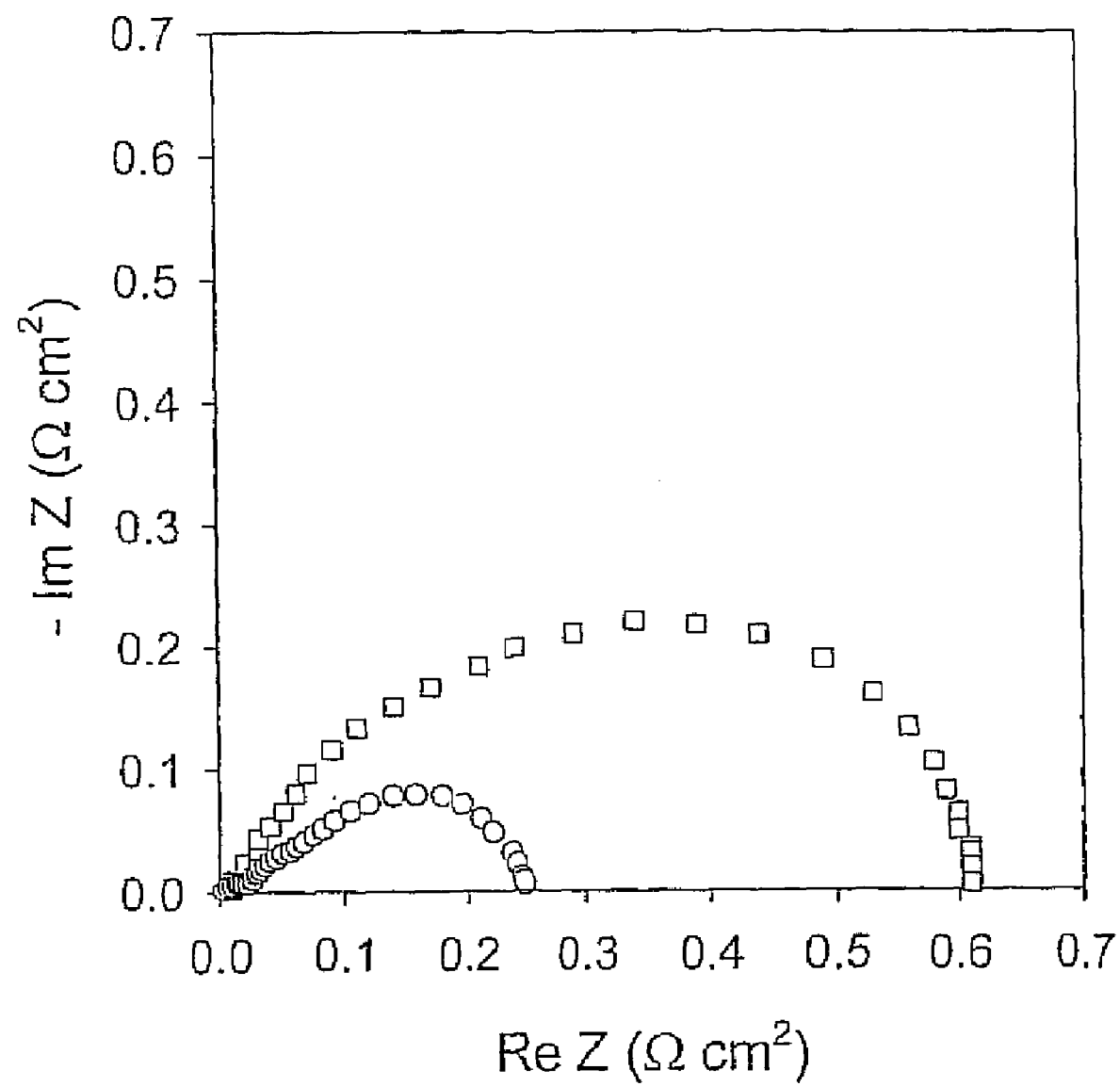

In some cells, a thin film interface of $Ce_{0.8}Gd_{0.2}O_2$ (CGO), prepared by a sol-gel process, was applied between the YSZ electrode and the anode. Anode polarisation resistance was further decreased with such a thin layer (5 μm) of CGO deposited between the YSZ electrolyte and LSCM anode as shown in FIG. 4 which illustrates a comparison of electrode impedance spectra for LSCM/CGO anodes. Spectra were measured at 925° C. in 4.9% H+2.3% H O+92.8% Ar(Y) and 97% H+3% H O(O). Three electrode configuration with LSCM/CGO as working electrode and Pt as counter and reference electrode. The polarization resistances in wet 5% $H_2$ and wet $H_2$ were about 0.62 Ωcm$^{-2}$ and 0.25 Ωcm$^{-2}$, respectively. The anode polarization in wet $H_2$ at 925° C. is comparable to that of the conventional Ni—YSZ cermet anode at 1000° C.

EXAMPLE 7

Preparation and Use of Functional Layer

Another possible application of the novel perovskite material of Example 1, involves using this material as a thin functional layer, approximately 20-50 microns thick, which is electrochemically active, on top of a conducting support such as a nickel zirconia cermet or on a porous steel current collector support, and in either case below a dense (<2% porosity) YSZ electrolyte.

In one practical application, a double perovskite LSCM material prepared according to Example 1 is used in a composite multi-layered anode structure with a pure nickel current collector layer, an LSCM outer functional layer, and a series of progressively graded Ni-LSCM cermet intermediate layers, as follows:

| Layer | Thickness | % Composition Nickel/LSCM |
| --- | --- | --- |
| Current Collector | 500 μm | 100/0 |
| Intermediate | 10 μm | 80/20 |
| Intermediate | 10 μm | 50/50 |
| Intermediate | 10 μm | 20/80 |
| Functional | 30 μm | 0/100 |

EXAMPLE 8

Preparation and Use of Interconnector

Mix the stoichiometric ratios (as in Example 1) of $La_2O_3$, $SrCO_3$, $Cr_2O_3$ and $Mn_2O_3$ together, add some acetone, ball-mill in a zirconia container with zirconia balls for 30 minutes. Fire at 1200° C. for 20 hours twice with ball-milling with acetone for 30 minutes after each firing, then dry press into 30 mm diameter pellets, and finally fire at 1500° C. for 36 hours. This provides a pellet with relative density of approximately 94% (i.e. 6% porosity). Typically lanthanum strontium chromite would require 1600° C. heat treat treatment to achieve similar densification.

Figure 5:
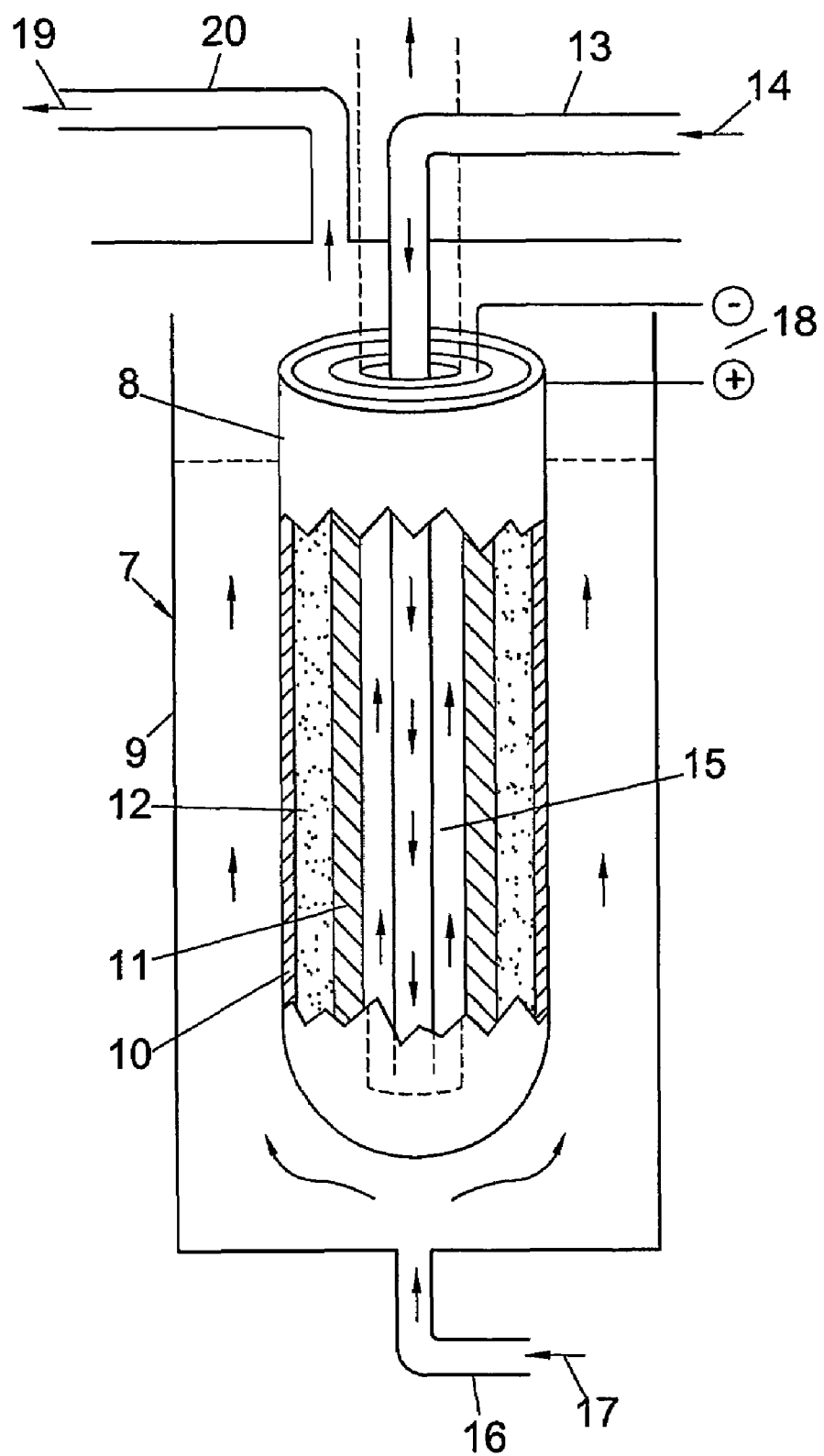
FIG. 5 is a schematic sectional view of an SOFC.

FIG. 5 shows schematically an SOFC generator 7 of the the invention for generating electricity from fuel gas. The generator 7 comprises a tubular SOFC element 8 mounted in a chamber 9 and having an outer tubular anode 10 and an inner tubular cathode 11 with an electrolyte 12 therebetween, the anode, cathode and electrolyte being of the same materials as those in the example illustrated in FIG. 2. An air inlet tube 13 is provided for introducing pre-heated air 14 into the interior 15 of the SOFC element 8, and a fuel gas supply pipe 16 provided for feeding pre-heated fuel gas 17 into the chamber 9 around the anode 10. Electrical connections 18 are connected to the cathode 11 and anode 10 for connection of the generator 7 to an electrical load in use of the generator. Exhaust gases 19 comprising spent air, unused fuel, and oxidation products, are vented from the chamber 9 by an exhaust pipe 20, although it is generally preferred that spent air 21 is exhausted separately from the unused fuel gas, via a separate exhaust conduit 22.

The invention claimed is:

1. An anode for a solid oxide fuel cell, wherein at least a part of the anode is a double perovskite oxide material having the general formula I:

(I)

wherein Ln is selected from the group consisting of Y, La, a Lanthanide series element, and any combination thereof and X also represents an element occupying the A site of a perovskite oxide and is selected from the group consisting of Sr, Ca and Ba, and $Z^1$ and $Z^2$ represent different elements occupying the B site of a perovskite oxide and are selected from the group consisting of Cr, Mn, Mg and Fe, and wherein a has a value from 0 to 1, b has a value of from 1 to 0, and each of c and d has a value of from 0.25 to 0.75, provided that a+b has a value of 1, and c+d, has a value of 1, and wherein e has a value of from 0.8 to 1, wherein f has a value of from 0.8 to 1, and g has a value of from 2.5 to 3.2; said material optionally including at least one dopant.

2. The anode of claim 1 wherein $Z^1$ and $Z^2$ represent Cr and Mn, respectively.

3. The anode of claim 1 wherein X represents Sr.

4. The anode of claim 1 wherein said at least one dopant is a B site dopant selected from the group consisting of V, Fe, Cu, Co, Ru, Ni, Pd, Ce, Ti, Nb, Mo and Mg.

5. The anode of claim 4 wherein the B site dopant is present at a level of not more than 20%.

6. The anode of claim 5 wherein the B site dopant is present at a level of from 5 to 20%.

7. The anode of claim 1 wherein in general formula I each of c and d has a value of at least 0.4.

8. The anode of claim 1 wherein at least 30% of the B sites are occupied by a third element $Z^3$.

9. The anode of claim 1 wherein, in general formula I, a has a value of from 0.7 to 0.9.

10. The anode of claim 9 wherein, in general formula I, a has a value of from 0.72 to 0.85.

11. The anode of claim 1 in which said double perovskite oxide material has a porosity of at least 20%.

12. The anode of claim 11, in which said double perovskite oxide material has a porosity of from 40 to 50%.

13. A solid oxide fuel cell having the anode or functional layer of the anode of claim 1.

14. An assembly for use in a solid oxide fuel cell said assembly including the anode as defined in claim 1.

15. A method of oxidising a fuel in a solid oxide fuel cell comprising the steps of:
   a) providing the solid oxide fuel cell having the anode as claimed in claim 1; and
   b) oxidizing said fuel in said solid oxide fuel cell.

16. The method as claimed in claim 15 wherein the solid oxide fuel cell uses a fuel selected from the group consisting of hydrogen; a hydrocarbon fuel compound; a hydrocarbon based fuel compound; a non-hydrocarbon hydride fuel compound, and at least partial reformations thereof.

17. The anode of claim 1 wherein, in general formula I, b has a value of from 0.25 to 0.75.

* * * * *